(12) United States Patent
Sepahvand et al.

(10) Patent No.: US 10,327,292 B2
(45) Date of Patent: Jun. 18, 2019

(54) RESONANT DC-TO-DC DRIVERS

(71) Applicant: THE REGENTS OF THE UNIVERSITY OF COLORADO, A BODY CORPORATE, Denver, CO (US)

(72) Inventors: Alihossein Sepahvand, Boulder, CO (US); Dragan Maksimovic, Boulder, CO (US); Khurram Afridi, Boulder, CO (US)

(73) Assignee: The Regents of the University of Colorado, a Body Corporate, Denver, CO (US)

( * ) Notice: Subject to any disclaimer, the term of this patent is extended or adjusted under 35 U.S.C. 154(b) by 0 days.

(21) Appl. No.: 16/027,830

(22) Filed: Jul. 5, 2018

(65) Prior Publication Data
US 2019/0021147 A1    Jan. 17, 2019

Related U.S. Application Data (60) Provisional application No. 62/533,317, filed on Jul. 17, 2017.

(51) Int. Cl.
*H05B 33/08* (2006.01)
*H02M 1/08* (2006.01)
*H02M 3/335* (2006.01)
*H02M 1/00* (2006.01)

(52) U.S. Cl.
CPC ........ *H05B 33/0815* (2013.01); *H02M 1/083* (2013.01); *H02M 3/33576* (2013.01); *H02M 2001/0058* (2013.01)

(58) Field of Classification Search
CPC ............ H05B 33/0809; H05B 33/0815; H05B 33/0827; H05B 33/0842; H05B 33/0845
USPC .................................................. 315/201, 294
See application file for complete search history.

(56) References Cited

U.S. PATENT DOCUMENTS

| 8,686,655 | B2 * | 4/2014 | Setomoto | H05B 33/0815 |
| | | | | 315/200 R |
| 9,225,254 | B2 * | 12/2015 | Christoph | H02M 3/337 |
| 9,426,854 | B1 * | 8/2016 | Ramabhadran | H05B 33/0815 |
| 2013/0020951 | A1 * | 1/2013 | Pollock | H05B 33/0809 |
| | | | | 315/186 |

(Continued)

OTHER PUBLICATIONS

Ouyang, Z., et al.,"Advances in Planar and Integrated Magnetics", Technical University of Denmark, 2011, 229 pages.

(Continued)

*Primary Examiner* — Tung X Le
(74) *Attorney, Agent, or Firm* — Saul Ewing Arnstein & Lehr LLP; Kathryn Doyle; Brian R. Landry (57) ABSTRACT

One aspect of the invention provides a DC-to-DC driver for at least one light-emitting diode (LED). The driver includes: a converter configured to drive the at least one light emitting diode (LED). The converter includes: an inverter; a rectifier configured to be coupled to the at least one LED; and a resonant tank coupled between the inverter and the rectifier. The resonant tank includes at least two inductors and at least three capacitors. Another aspect of the invention provides a lamp including: at least one light-emitting diode (LED); and the DC-to-DC converter of any of the embodiments of the invention described herein electrically coupled to the at least one light-emitting diode (LED).

10 Claims, 11 Drawing Sheets

(56) References Cited

U.S. PATENT DOCUMENTS

| | | | |
|---|---|---|---|
| 2013/0119888 A1* | 5/2013 | Elferich .............. | H02M 1/4258 |
| | | | 315/291 |
| 2013/0188397 A1* | 7/2013 | Wu ................... | H02M 3/33576 |
| | | | 363/17 |
| 2013/0307427 A1* | 11/2013 | Liang .................... | H05B 37/02 |
| | | | 315/201 |

OTHER PUBLICATIONS

Perreault, D. J., et al., "Opportunities and Challenges in Very High Frequency Power Conversion", in Proceedings of IEEE, 2009, 15 pages.

Sepahvand, A., et al., High-Frequency ZVS Ćuk Converter for Automotive LED-Driver Applications Using Planar Integrated Magnetics, SELECT Annual Meeting and Technology Showcase—Logan, Utah ,Sep. 27-28, 2016.

Sepahvand, A., "High Frequency DC-DC Power Conversion for Automotive LED Driver Applications", Ph.D. Defense Exam, University of Colorado, Mar. 20, 2017.

* cited by examiner

RESONANT DC-TO-DC DRIVERS

CROSS-REFERENCE TO RELATED APPLICATION

This application claims priority under 35 U.S.C. § 119(e) to U.S. Provisional Patent Application Ser. No. 62/533,317, filed Jul. 17, 2017. The entire content of this application is hereby incorporated by reference herein.

BACKGROUND OF THE INVENTION

Light-emitting diodes (LEDs) with DC-to-DC drivers are increasingly used in many applications as compared to conventional incandescent lamps, as LED-based lighting solutions result in lower power consumption, longer lifetime, and additional flexibility. Specifically, LEDs are becoming more common within general lighting and automotive applications.

LEDs are commonly driven DC-to-DC drivers that are designed to operate over a wide range of output and input voltages. Further, DC-to-DC drivers also need to provide precise regulation of LED (output) current and high resolution dimming in order to vary the LEDs' light intensity without adverse optical effects such as flicker. Further, for automotive applications, DC-to-DC drivers must be designed to meet challenging electromagnetic interference (EMI) requirements, as conventional DC-to-DC drivers may raise issues with AM radio interference. However, current DC-to-DC designs are unable to meet all of these requirements.

SUMMARY OF THE INVENTION

One aspect of the invention provides a DC-to-DC driver for at least one light-emitting diode (LED). The driver includes: a converter configured to drive the at least one light emitting diode (LED). The converter includes: an inverter; a rectifier configured to be coupled to the at least one LED; and a resonant tank coupled between the inverter and the rectifier. The resonant tank includes at least two inductors and at least three capacitors.

This aspect of the invention can have a variety of embodiments. The at least three capacitors can include: a first capacitor, a second capacitor, and a third capacitor. The at least two inductors can include: a first inductor and a second inductor.

The first capacitor can be coupled between the first inductor and the second inductor, the second capacitor can be coupled between the first inductor and a first voltage potential, and the third capacitor can be coupled between the second inductor and the first voltage potential. The first inductor can be coupled to the inverter and the second inductor can be coupled to the rectifier.

An inductance of the first inductor can be different than an inductance of the second inductor. An inductance of the first inductor can be greater than an inductance of the second inductor. An inductance of the first inductor can be smaller than an inductance of the second inductor.

A capacitance of the first capacitor can be equal to a capacitance of the third capacitor.

The inverter can be a half-bridge inverter.

The rectifier can be a half-bridge rectifier.

The converter can be free from integrated magnetics.

Another aspect of the invention provides a lamp including: at least one light-emitting diode (LED); and the DC-to-DC converter of any of the embodiments of the invention described herein electrically coupled to the at least one light-emitting diode (LED).

DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

EQUIVALENTS

Although preferred embodiments of the invention have been described using specific terms, such description is for illustrative purposes only, and it is to be understood that changes and variations may be made without departing from the spirit or scope of the following claims.

DETAILED DESCRIPTION OF THE INVENTION

Applicant has found that there is a need for an LED driver with a converter that is able to function at high frequencies (>1.6 MHz) and that is also smaller in size as compared to conventional designs. Further, Applicant has found that the converter of the present disclosure achieves soft-switching and maintains minimal circulating currents across wide operating ranges. Further, the converter of the present design features current source characteristics, making it particularly suitable for automotive LED driver applications as compared to conventional designs.

Figure 8:
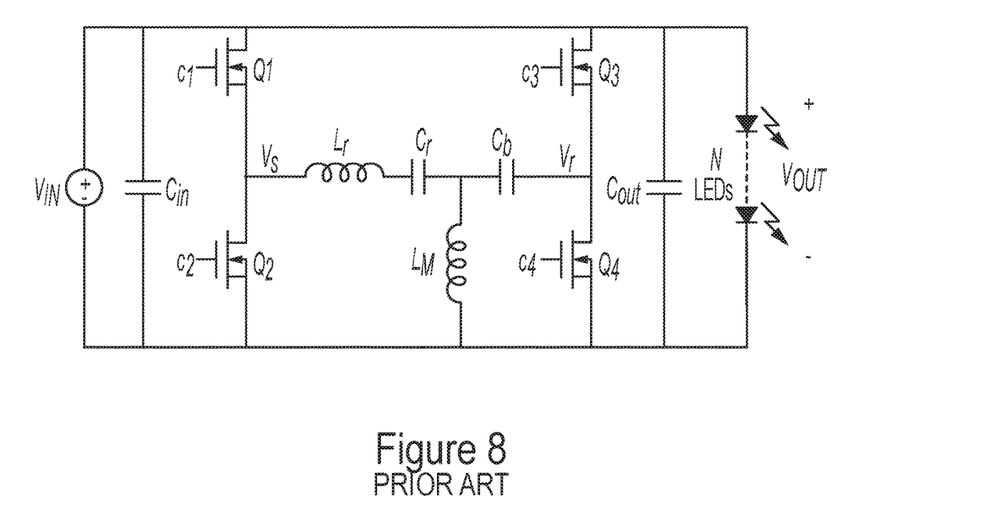
FIGS. 8 and 9 illustrate embodiments of conventional prior art converters.

A conventional LLC (inductor-inductor-capacitor) resonant DC-to-DC converter is shown in FIG. 8. To understand the limitations of the conventional LLC resonant converter, the converter was analyzed using sinusoidal approximation, where only the first harmonic of the waveforms was considered. Under this approximation the inverter stage can be modeled as a sinusoidal voltage source with an amplitude $$v_s = \frac{2V_{IN}}{\pi}.$$

The rectifier is modeled as an effective resistor, given by:

$$R_{\mathit{eff}} = \frac{2V_{OUT}}{\pi^2 I_{OUT}}. \qquad \text{Equation 1}$$

Figure 9:
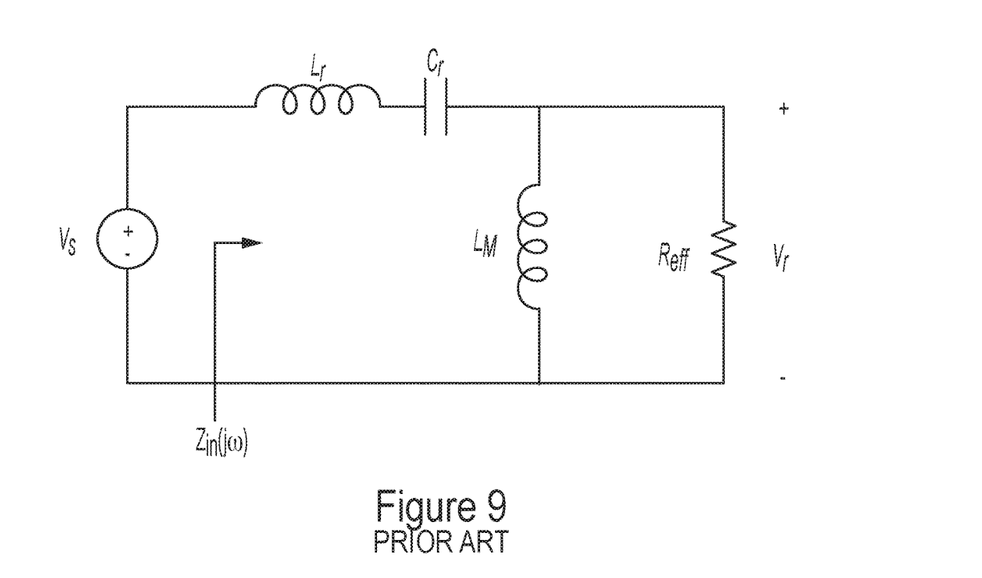

The equivalent fundamental-frequency circuit model is shown in FIG. 9 and the input impedance of the resonant tank $z_{in}(j\omega)$ can be expressed as $$z_{in}(j\omega) = L_r + \frac{1}{C_r j\omega} + R_{\mathit{eff}} \| L_m j\omega. \qquad \text{Equation 2}$$

The normalized voltage conversion ratio $$M = \frac{v_r}{v_s}$$

is expressed as.

$$M(f_n, \lambda, Q) = \frac{R_{\mathit{eff}} \| L_M j\omega}{z_{in}(j\omega)}, \qquad \text{Equation 3}$$

$$M(f_n, \lambda, Q) = \frac{1}{1+\lambda+\frac{\lambda}{f_n}+jQ\left(f_n - \frac{1}{f_n}\right)}. \qquad \text{Equation 4}$$

where $Z_o = \sqrt{\frac{L_r}{C_r}}$ and $Q = \frac{\sqrt{\frac{L_r}{C_r}}}{R_{\mathit{eff}}}$ are the characteristic impedance and the quality factor of the series resonance tank ($L_r$ and $C_r$) respectively.

$$\lambda = \frac{L_r}{L_M} \text{ and } f_n = \frac{f_s}{f_r}$$

is the normalized switching frequency with $$f_r = \frac{1}{2\pi\sqrt{L_r C_r}}.$$

Figure 10:
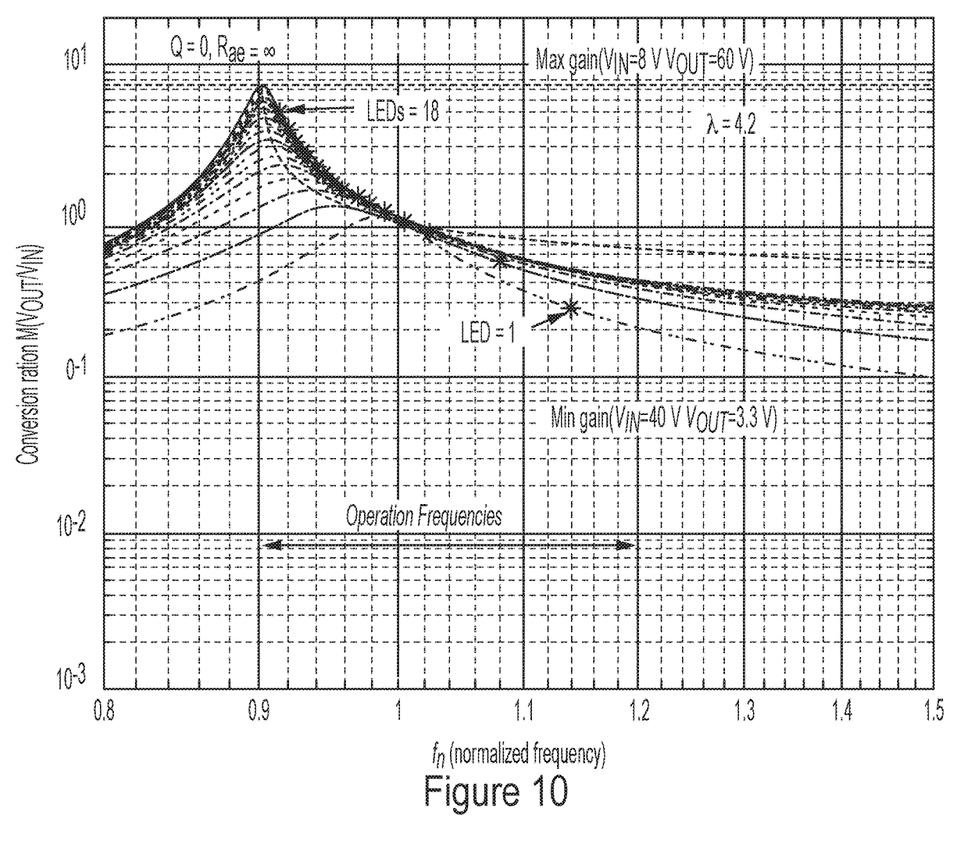
FIGS. 10-12 illustrate simulation results of conventional prior art converters.

The normalized voltage conversion ratio of the LLC resonant DC-to-DC converter M is shown as a function of the normalized frequency $f_n$, for various values of Q (corresponding to different numbers of LEDs) in FIG. 10. The converter input voltage $V_{IN}$ is in the range of 8 V to 40 V and the output current is set at $I_{OUT}$=0.5 A. The output voltage of the converter varies from about 3 V to about 60 V (N=1-18). The ratio of $L_r$ to $L_M$, $\lambda$, is selected such the required maximum and minimum gain are guaranteed in the specified normalized frequency range, $f_n$=0.9 to 1.2 (for example, $f_s$=1.8 to 2.4 MHz). As the number of LEDs varies, N=1 to 18, the converter switching frequency needs to be adjusted across a wide range to provide the required gain, as also shown in FIG. 10.

Figure 11:
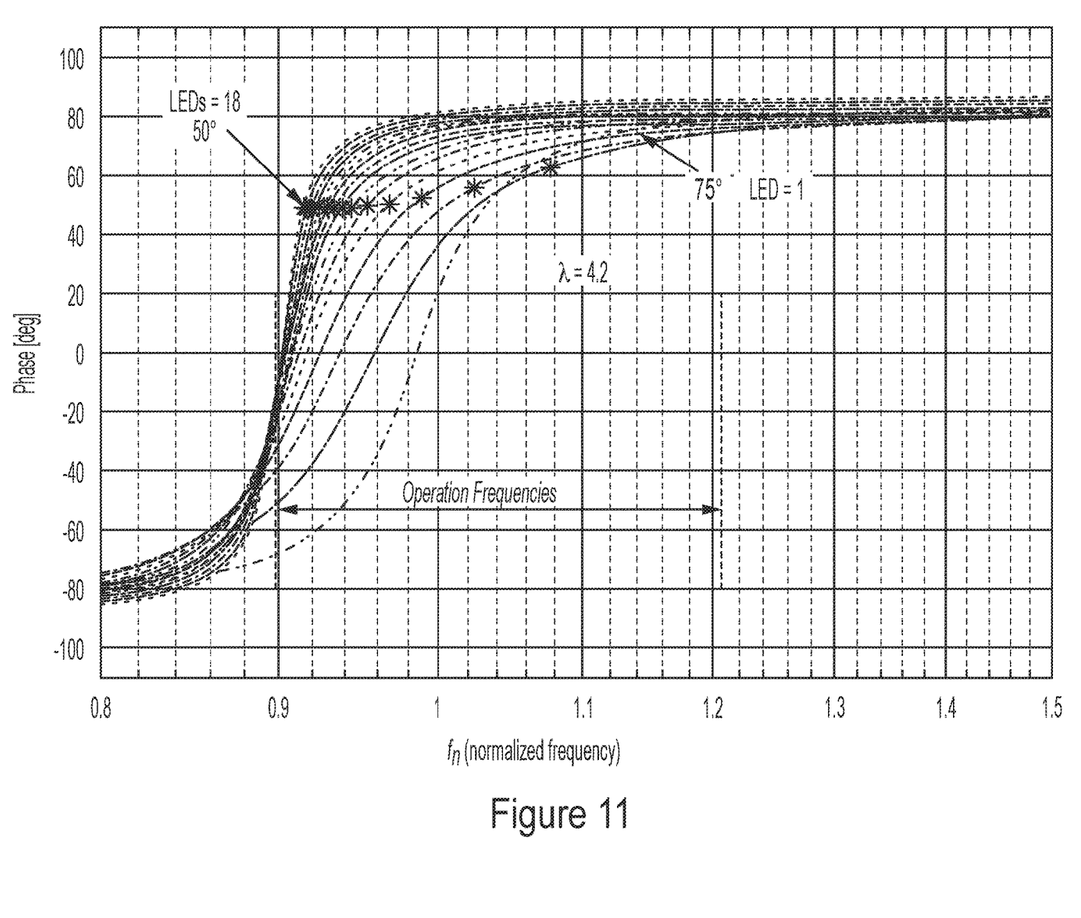
Figure 12:
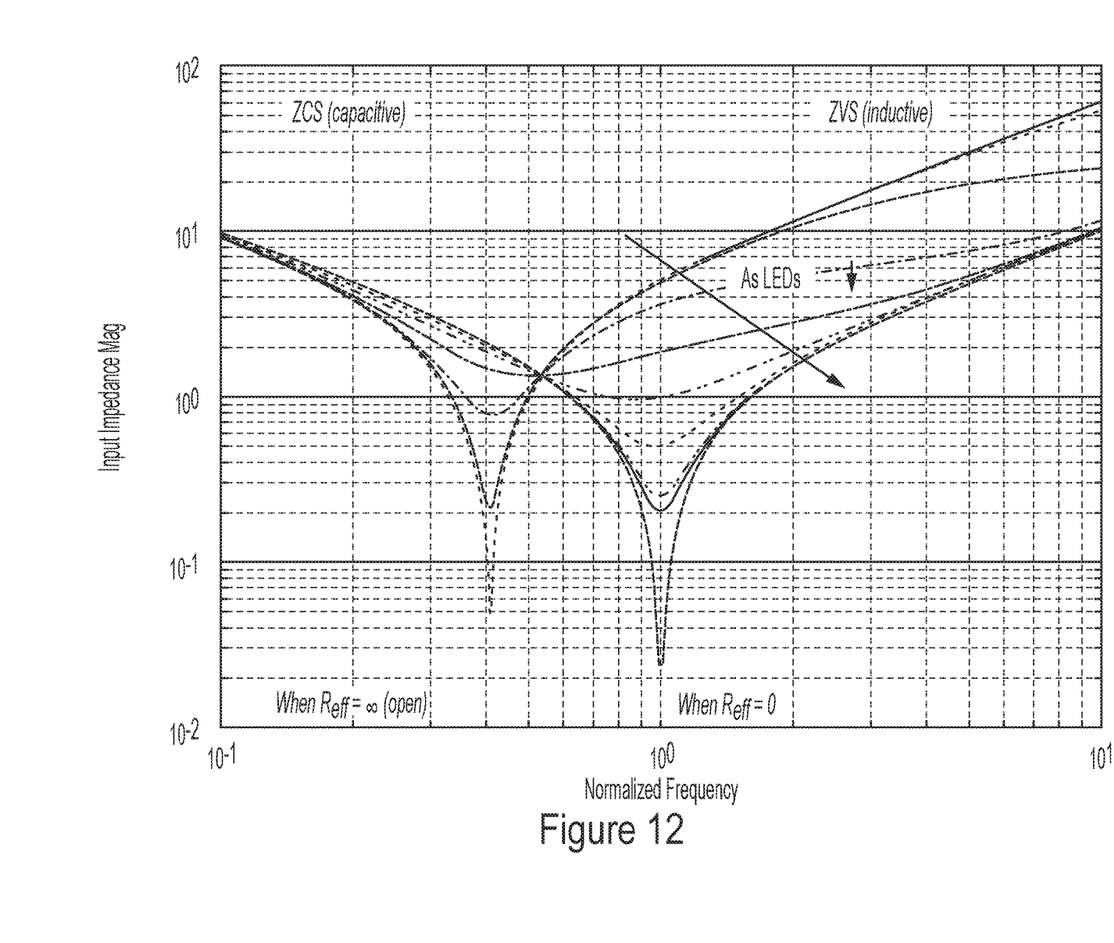

The operating points can be selected in the inductive region to ensure ZVS of the inverter transistors. The phase of the resonant tank input impedance is plotted versus normalized switching frequency $f_n$ in FIG. 11. The operating points of the converter are overlaid on the phase plot. As is illustrated, across the operating range, the phase remains positive, indicating that the inverter is inductively loaded. However, because the phase is always greater than 50°, the converter suffers from high circulating currents. This can be better understood by evaluating the magnitude of the input impedance of the LLC converter's resonant tank $|z_{in}|$ which is shown for various numbers of LEDs in FIG. 12. As the number of LEDs N decreases, corresponding to a decrease in the effective load resistance $R_{\mathit{eff}}$ (indicating less output power is required), the magnitude of the tank input impedance decreases monotonically. Therefore, as the number of LEDs increases, the magnitude of the tank input current is higher, and hence higher circulating currents are generated. This results in reduced efficiency, making the LLC resonant DC-to-DC converter ill-suited for an automotive LED driver application with wide input and output voltage ranges.

Figure 1:
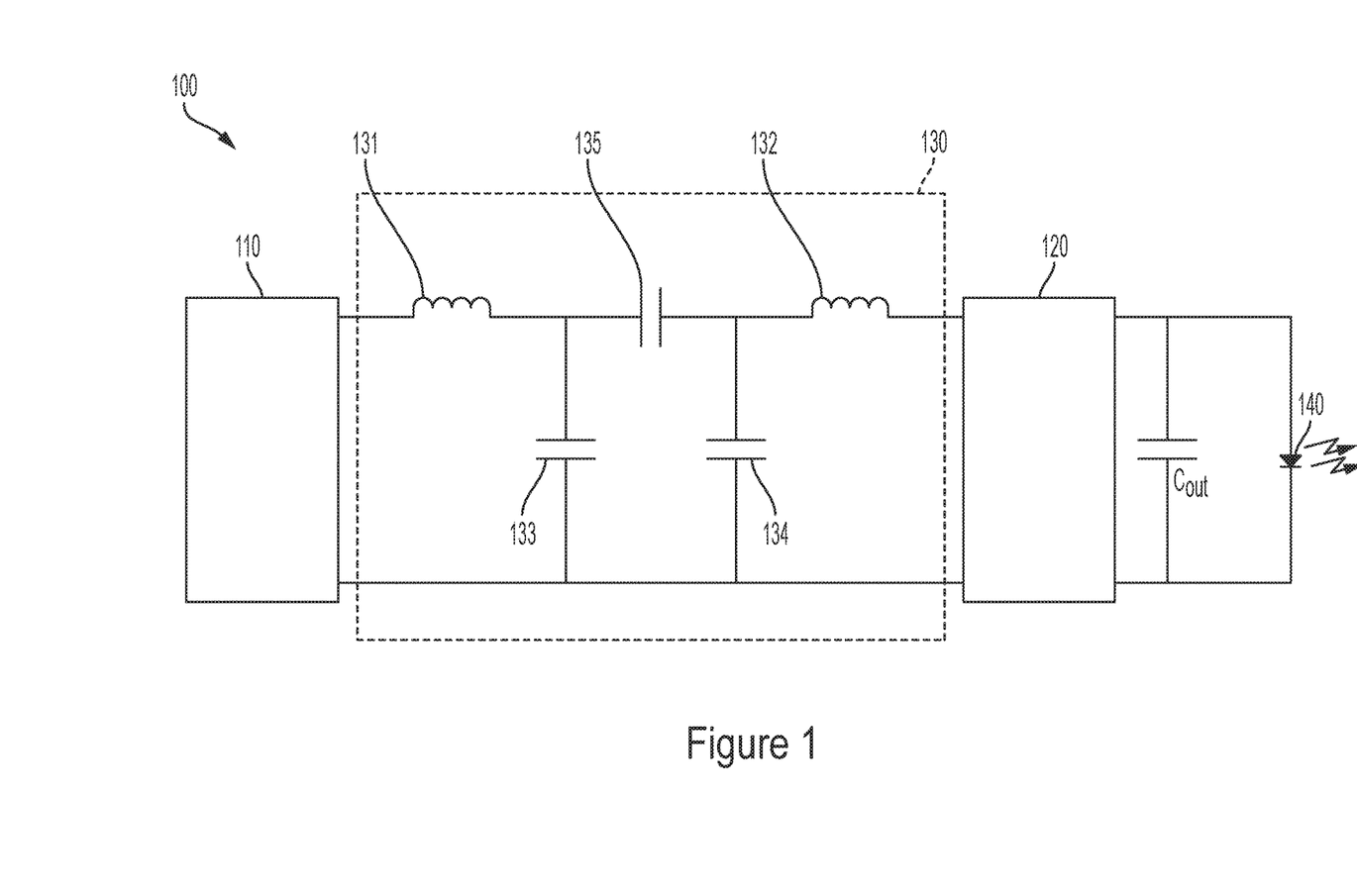
FIG. 1 illustrates a converter for a DC-to-DC driver according to one or more embodiments of the disclosure.

FIG. 1 illustrates an embodiment of a converter 100 for a DC-to-DC driver for driving at least one light emitting diode (LED) that overcomes the limitations of the LLC converter described above. The converter 100 utilizes a converter topology in which the magnitude of the resonant tank input impedance increases, and hence the tank input current decreases, as the number of LEDs decreases.

In the illustrated embodiment, the converter 100 includes inverter 110, rectifier 120 and resonant tank 130. The rectifier 120 is configured to be coupled to one or more LEDs 140 and the resonant tank 130 is coupled between the inverter 110 and rectifier 120. Further, the resonant tank 130 includes at least two inductors (131 and 132) and at least three capacitors (133, 134 and 135).

In various embodiments, one or more LEDs 140 may comprise any number of LEDs. Further, in various embodiments, one or more of the LEDs may be configured such that they are not driven by the LED driver. For example, in one embodiment, at least two LEDs are shorted out such that they are not driven and turned on by the LED driver. Further, depending on the operating mode, any number of LEDs may be driven for operation or not driven.

In one embodiment, the converter 100 is included within a lamp. The lamp may further include any number of LEDs and other hardware elements. For example, in one embodiment, the LED lamp may comprise at least one lens and/or one or more phosphors configured to converter light emitted by an LED.

The inverter 110 receives a DC power signal and converts the DC power signal to a varying voltage signal, which is provided to the resonant tank 130. In one embodiment, the inverter 110 is a half-bridge inverter. Further, the inverter can include at least two transistors controlled by a control signal. In one embodiment, the transistors are configured to switch alternatively at a 50% duty cycle. In one or more embodiments, the inverter 130 includes a capacitor configured to condition the DC power signal.

The rectifier 120 converts an output signal of the resonant tank 130, generating a converter output signal that is driven onto one or more LEDs 140. In one embodiment, a capacitor, $C_{out}$, is disposed in parallel to the one or more LEDs 140 at the output of rectifier 120 to further condition the current signal and to provide a constant current to the one or more LEDs 140. In one embodiment, the rectifier 110 is a half-bridge rectifier and includes at least two transistors controlled by a control signal. In one embodiment, the transistors are configured to switch alternatively at a 50% duty cycle.

In one embodiment, the resonant tank 130 receives the output AC signal from the inverter 110 and generates a transformed signal to the rectifier 120 such that converter output signal has a voltage level different from that of the DC power signal. For example, the voltage level of the transformed signal may be greater or less than the voltage level of the DC power signal. In one embodiment, the resonant tank 130 generates a current signal corresponding to the DC power signal and the switching frequency of the converter.

In one embodiment, the transformed signal corresponds to the one or more LEDs 140 coupled to the converter 100. For example, the one or more LEDs 140 may include 1 to 15 series-connected LEDs with a corresponding required voltage range of between about 3 V to about 50 V. In such an example, the resonant tank 130 transforms the voltage of the DC power signal such that it is able to power the one or more LEDs 140. The voltage of the input DC power signal may be between about 12 V and about 14 V, but can be as low as about 4.5 V (e.g., during cold-start events) or as high as 45 V (e.g., during "load dump" events). The resonant tank 130 receives an AC signal based on the DC power signal from the inverter and generates a transformed signal configured to power the one or more LEDs 140. In one example, about 50 V are required to power 15 LEDs and the voltage of the DC power signal is about 12 V. The resonant tank 130 receives an AC signal that is based on DC power signal and generates a transformed signal having a voltage level of 50 V.

In one embodiment, the resonant tank 130 includes inductor 131, inductor 132, capacitor 133, capacitor 134 and capacitor 135. The capacitor 135 may be coupled between inductors 131 and 132. The inductor 131 may be coupled to the output of the inverter 110 and the inductor 132 may be coupled to the output of the rectifier 132. The capacitor 133 may be coupled between the inductor 131 and a voltage potential and the capacitor 134 may be coupled between the inductor 132 and a voltage potential. In one embodiment, the voltage potential may be ground. The resonant tank 130 may also be referred to as a "converter" or an "LC³L converter".

In various embodiments, the inductance of inductor 131 and the inductance of inductor 132 differ. In one embodiment, the inductance of inductor 131 is greater than the inductance of inductor 132. In another embodiment, the inductance of inductor 132 is greater than the inductance of inductor 131. In various embodiments, the inductance of inductor 131 and the inductance of inductor 132 depend on the switching frequency of the converter 100. In one particular embodiment, the inductance of the inductor 131 is 180 nH and the inductance of inductor 132 is 100 nH. Further, in other embodiments, the inductance of the inductor 131 is 100 nH and the inductance of inductor 132 is 180 nH.

In one embodiment, the capacitance of capacitor 134 is equal to the capacitance of capacitor 135. Further, the capacitance of capacitor 133 may be greater than the capacitance of capacitor 134 and the capacitance of capacitor 135. For example, the capacitance of capacitor 133 may be about ten times greater than the capacitance of capacitor 134 and the capacitance of capacitor 135. In one particular embodiment, the capacitance of capacitor 133 is about 2.3 nF and the capacitance of capacitor 134 and the capacitance of capacitor 135 is about 0.25 nF.

In various embodiments, the resonant tank 130 is configured such that the magnitude of the resonant tank input impedance increases, and hence the tank input current decreases, as the number of LEDs decreases.

In one embodiment, the impedance of the resonant tank 130, $z_{in}(j\omega)$, is given by the following equation:

$$z_{in}(j\omega) = \qquad \text{Equation 5}$$
$$a + jb = L_1 j\omega + \frac{1}{C_2 j\omega} \left\| \left( \frac{1}{C_3 j\omega} + \left( \frac{1}{C_4 j\omega} \right\| (L_2 j\omega + R_{\mathit{eff}}) \right) \right).$$

In Equation 5, $L_1$ is the inductance of the inductor 131, $L_2$ in the inductance of the inductor 132, $C_2$ is the capacitance of the capacitor 133, $C_3$ is the capacitance of the capacitor 135, and $C_4$ is the capacitance of the capacitor 134.

In various embodiments, to ensure minimal circulating currents, the resonant tank 130 is configured such that imaginary part b of the input impedance is close to zero. Such a configuration results in the following relationships:

$$C_2 = \frac{2(L_1 - 2L_2)}{L_1(L_1 - 4L_2)\omega^2}, \qquad \text{Equation 6}$$

$$C_3 = \frac{2}{(4L_2 - L_1)\omega^2}, \qquad \text{Equation 7}$$

$$C_4 = C_3. \qquad \text{Equation 8}$$

As can be seen from the above equations, Equations 5-8 have no dependence on the output voltage or power of the converter 100, and thus, circulating currents are minimized regardless of the number of LEDs that are coupled to and drive by the converter 100. Based on Equation 6, the real part of the resonant tank 130 input impedance may be given by:

$$a = \frac{L_1^2 \omega^2}{4 R_{\mathit{eff}}}. \qquad \text{Equation 9}$$

Further, the magnitude of the resonant tank 130 input current may be given by:

$$I_{in} = \frac{2V_{IN}}{\pi a} = \frac{2V_{IN}}{\pi \frac{L_1^2 \omega^2}{4R_{\mathit{eff}}}} = \frac{16 V_{IN} V_{OUT}}{\pi^3 \omega^2 L_1^2 I_{OUT}}. \qquad \text{Equation 10}$$

Figure 2:
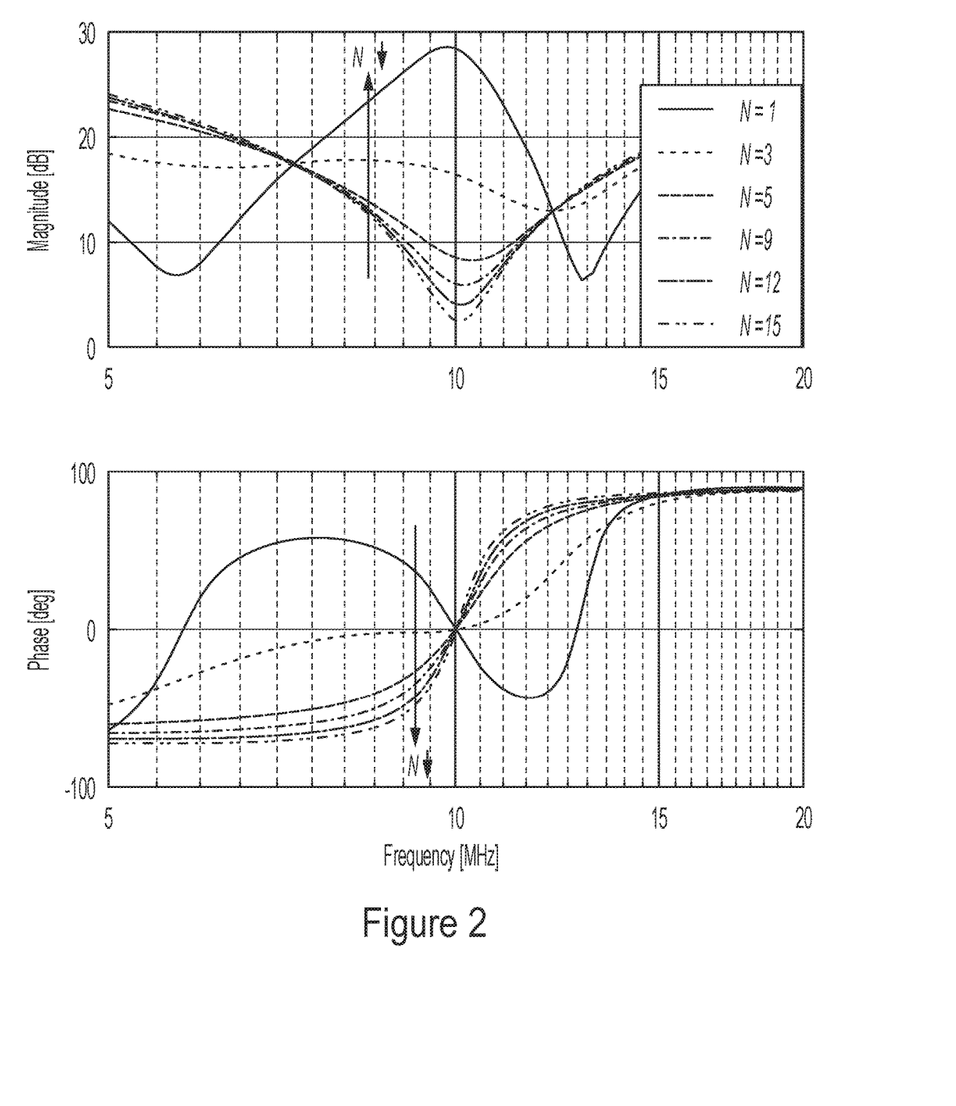
FIG. 2 illustrates the magnitude and phase of the tank input impedance in a DC-to-DC driver according to one or more embodiments of the disclosure.

Equation 10 indicates that for a constant output current $I_{OUT}$, as the number of LEDs decreases, corresponding to decreasing $V_{OUT}$, the magnitude of the tank input current also decreases. This is in contrast to a more typical LLC converter, and makes the proposed resonant tank well-suited for LED driver applications. The behavior of the resonant tank 130 is shown in FIG. 2. As is shown in the example of FIG. 2, the design frequency is 10 MHz and, depending on the number of LEDs, the switching frequency may be selected slightly higher or lower than the design frequency such that the resonant tank 130 input impedance has a positive phase, as can be seen in FIG. 2.

Assuming lossless conversion, the output of the resonant tank 130, $I_{OUT}$, may be given by:

$$I_{OUT} = \frac{2\sqrt{2}\, V_{IN}}{\pi L_1 \omega}. \qquad \text{Equation 11}$$

It can be seen that the output of the resonant tank 130 does not depend on the output voltage and hence the number of LEDs. Therefore, this converter behaves like a current source, and is capable of supplying a constant current to a string of variable numbers of LEDs. With variations in the input voltage, the output current can be controlled by modifying the phase-shift between the inverter and the rectifier, or using narrowband frequency variations.

Figure 3:
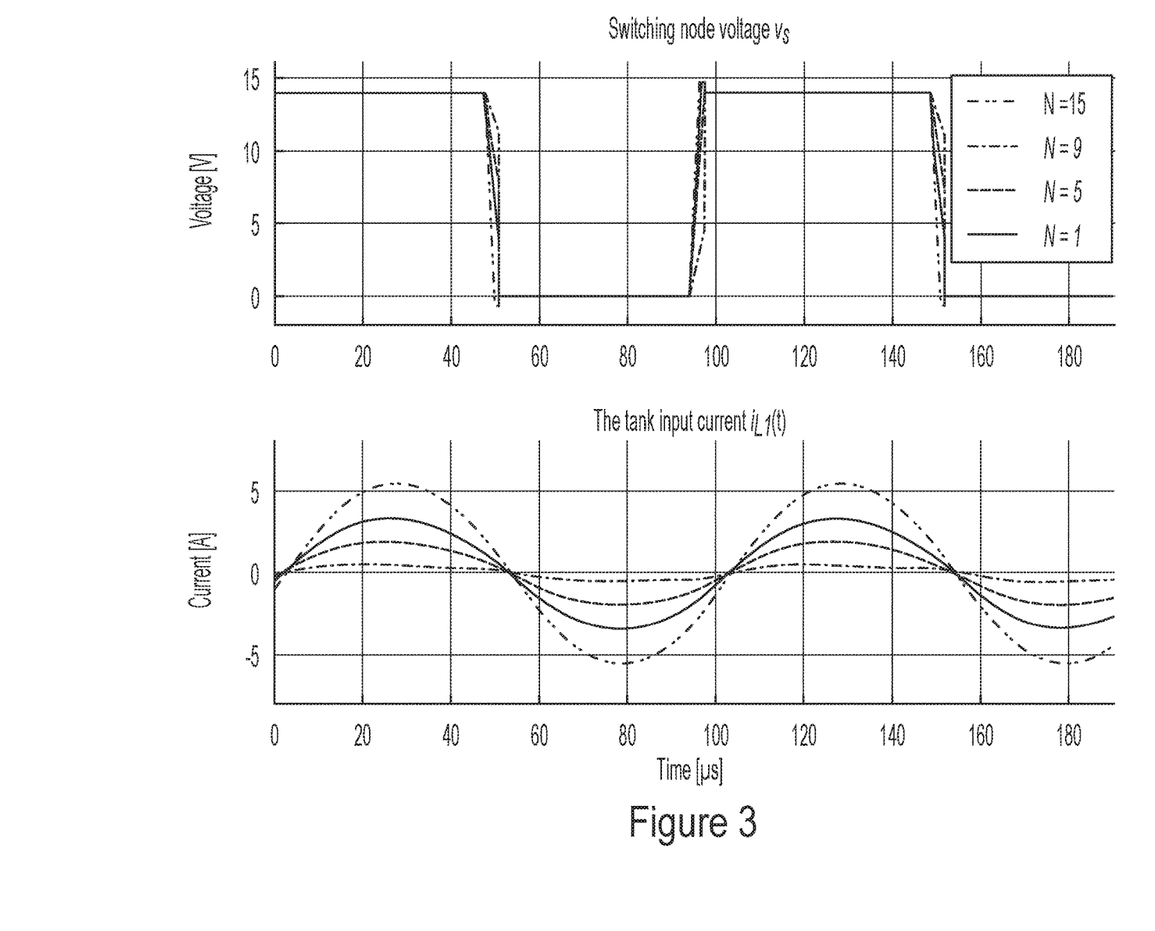
FIG. 3 illustrates simulation waveforms of a resonant tank according to one or more embodiments of the disclosure.
Figure 4A:
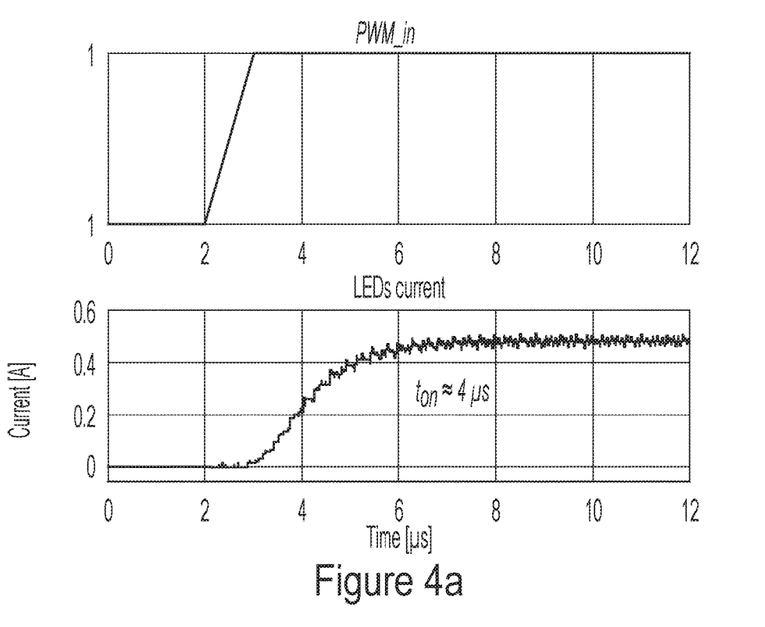
FIGS. 4a, 4b, 5a and 5b illustrate turn-on and turn-off times for a converter for a DC-to-DC driver according to one or more embodiments of the disclosure.
Figure 4B:
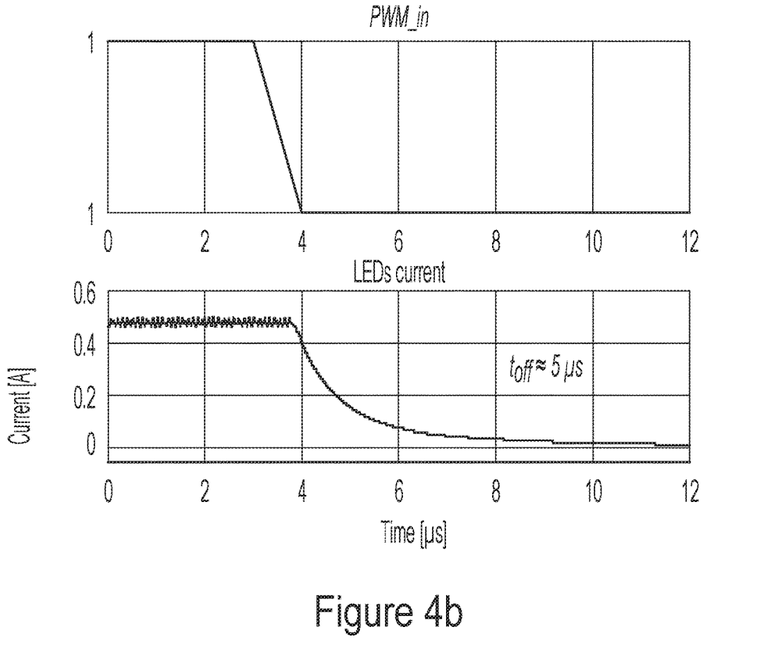
Figure 5A:
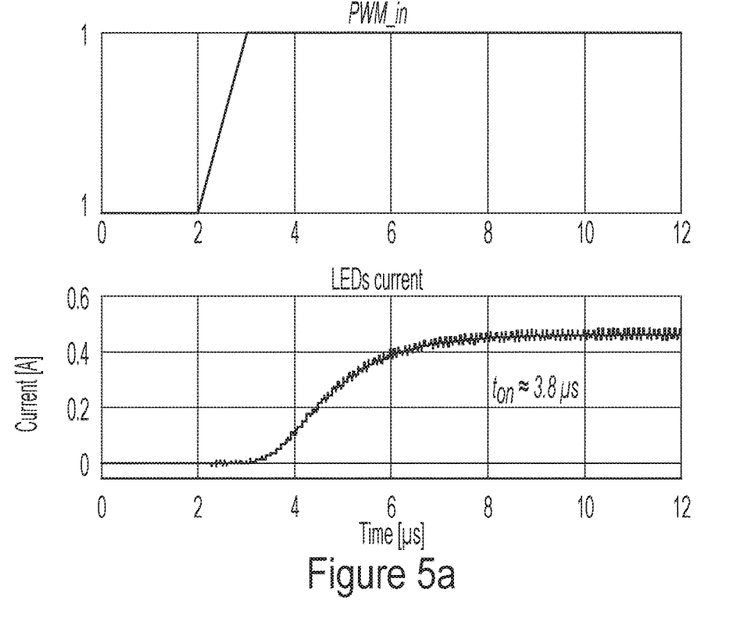
Figure 5B:
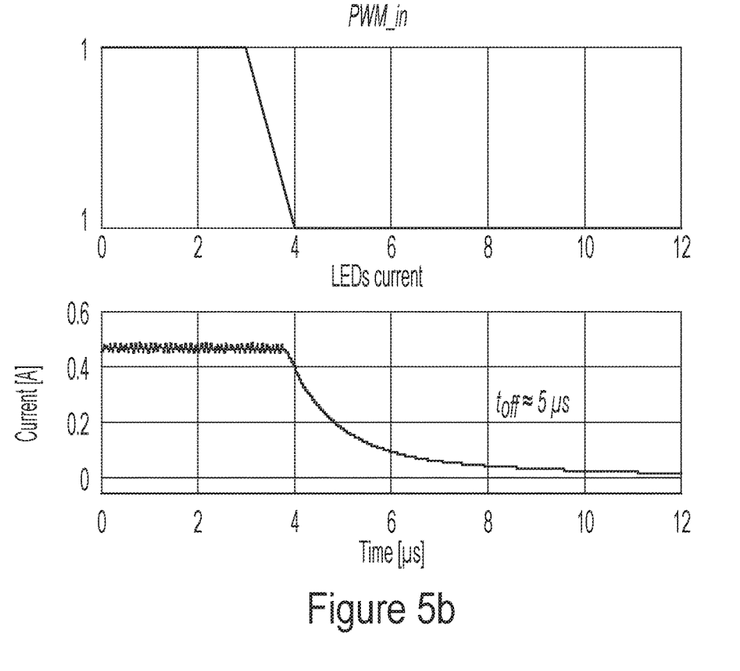

FIG. 3 illustrates simulation waveforms for switching node voltage $v_s$ and resonant tank input current $i_{131}$. As can be seen, the converter 100 achieves ZVS over a wide range of operating conditions. As shown by Equation 10, the magnitude of the resonant tank input current decreases as the number of LEDs decreases, while its phase remains slightly inductive with minimal circulating currents. The converter's power-on and power-off times are depicted in FIGS. 4a and 4b, respectively for $V_{IN}$=14 V, $I_{OUT}$=0.5 A, N=1 and $C_{out}$=1 μF. Also, as is shown in FIGS. 5a and 5b, the power-on and power-off times are presented for $V_{IN}$=14 V, $I_{OUT}$=0.5 A, N=12 and $C_{out}$=50 nF. The converter output capacitor may be selected such that the LED or LEDs current ripple is less than 10%. As is illustrated in FIGS. 12a and 12b, the converter 100 has about 4 μs power-on time and power-off time. In various embodiments, improved performance of the converter is due to higher switching frequency and reduced energy storage requirements.

Figure 6:
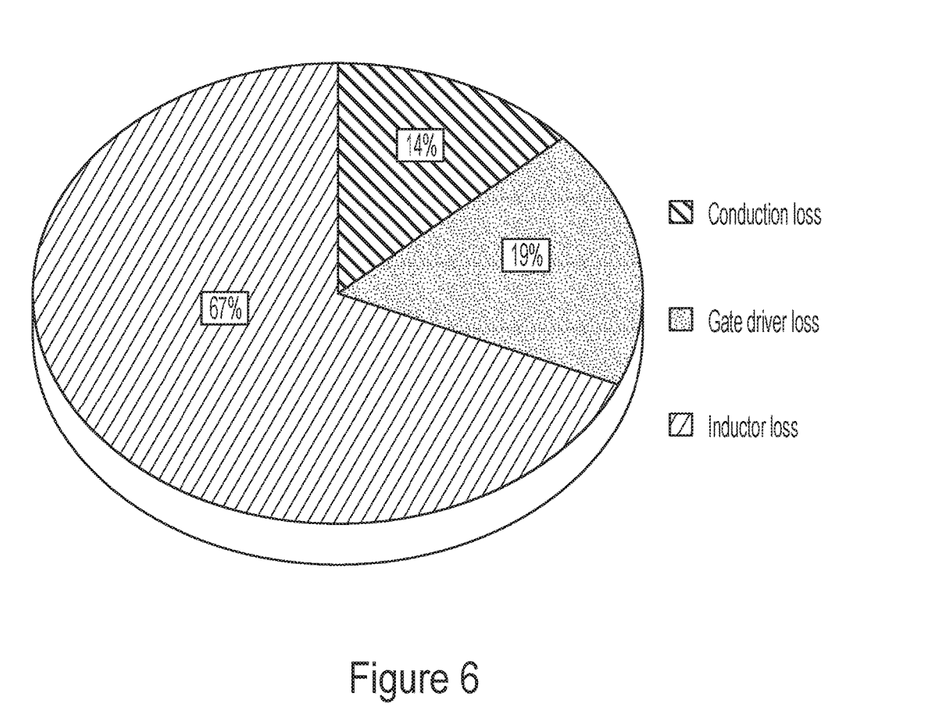
FIG. 6 illustrates converter loss by according to the elements of the converter according to one or more embodiments of the disclosure.

In various embodiments, the converter 100 has an efficiency of at least 86.7% for a $V_{IN}$=14 V, $I_{OUT}$=0.5 A, N=12, switching frequency of 10 MHz and $C_{out}$=50 nF. In one embodiment, the converter 100 has an efficiency of at least 85% depending on the input voltage, the input current, the number of nodes, the switching frequency and the output capacitance. FIG. 6 illustrates an example loss breakdown according to elements of the converter. As can is shown, loss due to the inductor is the greatest amount, followed by gate driver loss and then conduction loss.

Figure 7A:
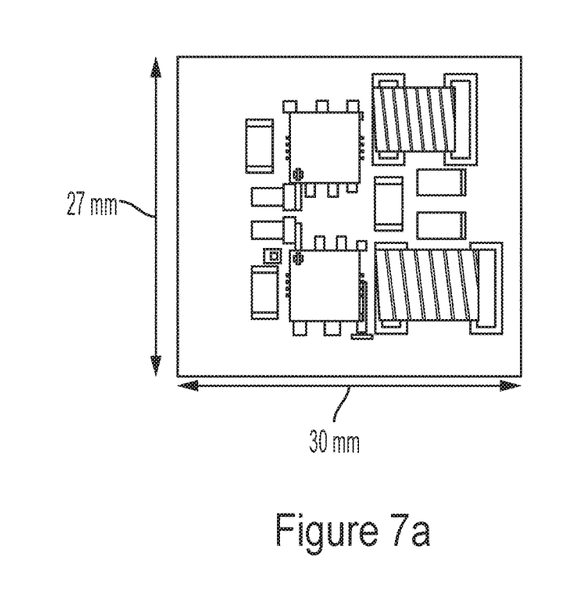
FIGS. 7a and 7b depict a comparison of different converters according to one or more embodiments of the disclosure.
Figure 7B:
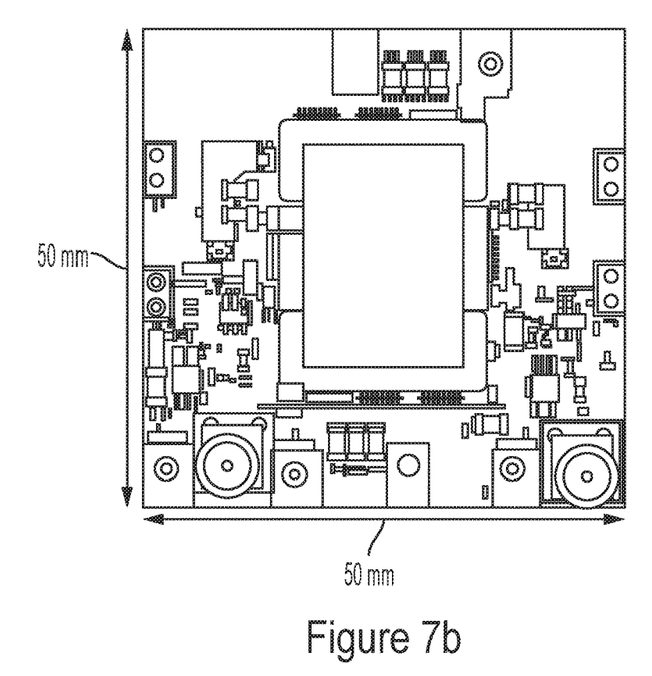

FIGS. 7a and 7b illustrate the size comparison between a converter corresponding to one or more embodiments of this disclosure and that of a Ćuk converter described in A. Sepahvand et al., "High-frequency ZVS Ćuk converter for automotive LED driver applications using planar integrated magnetics," in *Proc. 2017 IEEE Applied Power Electronics Conference and Exposition (APEC)* 2467-74 (2017). As can be seen, the Ćuk converter of FIG. 7b is larger than the converter of FIG. 7a. In one embodiment, the volume of converter of FIG. 7a is 92% smaller than that of the Ćuk converter of FIG. 7b. Further, the area of the converter of FIG. 7a is 65% less than that of the Ćuk converter of FIG. 7b.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

The invention claimed is:

1. A DC-to-DC driver for at least one light-emitting diode (LED), the driver comprising:
   a converter configured to drive the at least one light emitting diode (LED), the converter comprising:
      an inverter;
      a rectifier configured to be coupled to the at least one LED; and
      a resonant tank coupled between the inverter and the rectifier, the resonant tank comprising at least two inductors and at least three capacitors, wherein:
         a first inductor is coupled to an output of the inverter;
         a second inductor is coupled to an output of the rectifier;
         a first capacitor is coupled between the first inductor and the second inductor;
         a second capacitor is coupled between a first node and a ground voltage potential, wherein the first node is located between the first inductor and the first capacitor; and
         a third capacitor is coupled between a second node and the ground voltage potential, wherein the second node is located between the first capacitor and the second inductor.

2. The driver of claim 1, wherein an inductance of the first inductor is different than an inductance of the second inductor.

3. The driver of claim 2, wherein an inductance of the first inductor is greater than an inductance of the second inductor.

4. The driver of claim 2, wherein an inductance of the first inductor is smaller than an inductance of the second inductor.

5. The driver of claim 1, wherein a capacitance of the first capacitor is equal to a capacitance of the third capacitor.

6. The driver of claim 1, wherein the inverter is a half-bridge inverter.

7. The driver of claim 1, wherein the rectifier is a half-bridge rectifier.

8. The driver of claim 1, wherein said converter is free from integrated magnetics.

9. A lamp comprising:
   at least one light-emitting diode (LED); and
   the DC-to-DC converter of claim 1 electrically coupled to the at least one light-emitting diode (LED).

10. The driver of claim 1, wherein the resonant tank is configured to:

increase a level of input impedance imposed by the resonant tank and decrease a level of input current received by the resonant tank based at least in-part on a decrease in a number of LEDs coupled to the rectifier.

* * * * *